United States Patent [19]
Thorn et al.

[11] Patent Number: 5,086,461
[45] Date of Patent: Feb. 4, 1992

[54] APPARATUS AND METHOD FOR PROVIDING EXISTING 1ESS AND 1AESS TELEPHONE SWITCHING EQUIPMENT WITH THE CAPABILITY OF USING THE SS7 PROTOCOL

[75] Inventors: David W. Thorn, Richardson; Rajendra Patel, Plano; Gordon Sohl, Richardson, all of Tex.

[73] Assignee: Network Access Corporation, Richardson, Tex.

[21] Appl. No.: 469,093

[22] Filed: Jan. 23, 1990

[51] Int. Cl.⁵ .................. H04M 3/42; H04M 7/06; H04M 7/12
[52] U.S. Cl. ........................ 379/230; 379/207; 379/284; 379/289
[58] Field of Search .......... 379/230, 229, 220, 221, 379/269, 289, 32, 33, 207, 284

[56] References Cited

U.S. PATENT DOCUMENTS

| | | | |
|---|---|---|---|
| 4,247,740 | 1/1981 | Anderson et al. | 379/124 |
| 4,499,336 | 2/1985 | Krikor et al. | 379/230 |
| 4,611,096 | 9/1986 | Asmuth | 379/207 |
| 4,636,584 | 1/1987 | Binkard et al. | 379/240 |
| 4,685,127 | 8/1987 | Miller et al. | 379/221 |
| 4,720,854 | 1/1988 | Sand | 379/269 |
| 4,782,519 | 11/1988 | Patel et al. | 379/221 |
| 4,853,955 | 8/1989 | Thorn et al. | 379/230 |

OTHER PUBLICATIONS

"CCITT Signalling System No. 7 in AXE 10", Jan Du Reitz et al., *Ericsson Review* (Sweden), No. 2, 1982, pp. 100–105.

*Primary Examiner*—Thomas W. Brown
*Attorney, Agent, or Firm*—Harold E. Meier

[57] ABSTRACT

The invention relates to upgrading existing telephone central offices having 1ESS or 1AESS switching equipment to utilize the SS7 protocol. In particular, the 1ESS and 1AESS switching equipment is provided with the capability of controlling the connection, management, and disconnection of telephone circuits using Signaling System Number 7 (SS7), a national and international standard set of protocols for providing such circuit control and providing and receiving information via the SS7 protocol for enabling enhanced service in the switching equipment.

24 Claims, 3 Drawing Sheets

APPARATUS AND METHOD FOR PROVIDING EXISTING 1ESS AND 1AESS TELEPHONE SWITCHING EQUIPMENT WITH THE CAPABILITY OF USING THE SS7 PROTOCOL

BACKGROUND OF THE INVENTION

1. Field of the Invention

The invention relates to telephone switching offices which utilize 1ESS or 1AESS (a trademark of AT&T Technologies, Inc.) switching equipment. In particular, the invention relates to a method and apparatus for providing the 1ESS and 1AESS switching equipment with the capability of controlling the connection, management and disconnection of telephone circuits using Signaling System #7 (SS7), a national and international standard set of protocols for providing such circuit control, and providing and receiving information via the SS7 protocol for enabling enhanced services in the switching equipment.

Further, the invention relates to apparatus interposed between the switching matrix and the customer dial pulse receivers of switching equipment such as the 1ESS switch or the 1AESS switch to collect called number digits dialed by a subscriber and change such digits as needed for enhanced services to the subscriber.

2. Description of the Prior Art

The existing telephone network in the United States of America is largely a remnant of the earlier AT & T Network which was divested into several regional holding companies pursuant to an order of a Federal Court. This existing network had been designed to provide the equivalent of an electrical connection between two points in the network. The only information originating within the telephone network, and the conveyance of this information, was related to the provision of a basic capability to connect the two points.

Advances in the state of the art of communications have lead to the possibility of providing the existing services of the telephone network in a more efficient manner while simultaneously establishing the foundation for new network services beyond the capability of the existing network. The realization of this possibility has resulted in both national and international development of new standards for communication protocols between the switching elements within the telephone network. These new standards are widely referred to as "Signaling System #7 (SS7)". For example, see TR-NPL-000246 "Bell Communications Research Specification of Signaling System No. 7, Revision #2, June 1987."

Providing SS7 capability to a No. 5 crossbar switch or the 1ESS and 1AESS switching systems has heretofore been accomplished by the apparatus and method described in U.S. Pat. No. 4,853,955, issued Aug. 1, 1989 and entitled "APPARATUS AND METHOD FOR PROVIDING EXISTING TELEPHONE SWITCHING EQUIPMENT WITH THE CAPABILITY OF USING THE SS7 PROTOCOL".

Other than the apparatus and method described in U.S. Pat. No. 4,853,955, the provision of SS7 capability within 1ESS and 1AESS switching systems would require an expensive upgrade or the replacement of the switch with a newer version. The difficulty of accomplishing the conversion of such switches is demonstrated by the inability of the trunk circuit interfaces on these switches to support the out-of-band signaling method employed by SS7 and by the lack of the capability for processing the SS7 protocol messages used to implement the services.

As the majority of telephones in the United States of America are connected to 1ESS (a Trademark of AT&T Technologies, Inc.) or 1AESS (a Trademark of AT&T Technologies, Inc.) switches, the replacement or upgrading of these switches would require vast economic expenditures by the telephone companies. Estimates of this replacement cost for a typical central office are frequently in excess of $3 million. The incurring of such costs for the replacement of switching equipment which is functioning well is not justified by initial increases in revenues from the provision of more efficient switching.

The present invention provides a method and apparatus for implementing SS7 capabilities within 1ESS and 1AESS Class 5 central offices. This is accomplished without affecting the underlying operating principles of the existing switching office. In addition, the SS7 capability is provided in a cost effective manner without adversely affecting the quality of service as perceived by the subscribers connected to such a switching office. Further, the SS7 capability is provided in such a manner so as not to adversely affect the operation of the upgraded switching office or the rest of the telephone system.

The SS7 protocol requires that the control signals for the management of the telephone circuits be transmitted from the calling switching office to the receiving switching office on a separate circuit from the trunk circuit on which the telephone message information is transmitted.

The present invention provides a switch command monitor interconnected to the switching processor to monitor the status of subscriber lines and connections to service circuits such as customer dial pulse receivers, ring generators and trunk circuits used for incoming or outgoing calls. The switch command monitor provides these functions and others which relate to determining switch connections between the lines, trunks and service circuits and provides this information to an adjunct processor. The present invention also includes a receiver module interposed between the existing switching matrix and the existing customer dial pulse receiver for examining the dialed digits to identify the specific call and the type of trunk circuit required (i.e. SS7, non-SS7 or intra-office), and the type of service required.

The receiver module thus collects the dialed digits and changes these digits as needed for enhanced services and provides the changed digits to the customer dial pulse receiver. In performing these functions the receiver module also provides, or is transparent to, all the functions provided by the customer dial pulse receiver. A trunk circuit interface is also coupled to the existing switching system for generating a trunk circuit identification signal which is related to the specific call. A processing unit is coupled to the switch command monitor, the receiver module, and the trunk circuit interface of receiving the signals representing the calling number, the called number, and the trunk circuit identification, all of which are related to the specific call. These signals are then transmitted on a separate line to the receiving switching office for management of the switching circuits on the receiving end to couple the incoming call to the correct receiving subscriber on the correct trunk circuit.

SUMMARY OF THE INVENTION

The present invention relates to apparatus and a method for providing existing 1ESS and 1AESS telephone switching equipment, that normally connects a calling subscriber to a receiving subscriber through a switching system having a switch matrix and a non-SS7 trunk circuit, with the capability of controlling the connection, management and disconnection of incoming and outgoing telephone circuits on SS7 trunk circuits using the SS7 protocol. The apparatus includes a switch command monitor coupled to the switching processor of an existing switching system for detecting the status condition of any subscriber and generating signals identifying the subscriber terminal for the specific call and the interconnections to and from the subscriber terminal. A receiver module is coupled to the output of the existing switch matrix for receiving the dialed called number digits and identifying interconnection signals from the system processor, and generating a signal related to the specific call consisting of the called number. The apparatus further includes means for coupling the called number from the receiver module to the switching system for routing the calling subscriber to the identified type of trunk circuit. Further, a trunk circuit interface is coupled to predetermined ones of the SS7 trunk circuits an the existing switching system for receiving the called number and generating an identification signal for a selected trunk circuit which is related to said specific call and coupling the calling line to the selected SS7 trunk circuit. An adjunct processor is coupled to the switch command monitor for receiving the signals representing the calling subscriber interconnections to the receiver module and the trunk circuit for the specific call and generating the calling number for the specific call. The processor also couples to the receiver module for receiving the signal representing the called number for the specific call, and is also coupled to the trunk circuit interface for receiving the trunk circuit identification signal for the specific call and transmitting the calling number, the called number, and the trunk circuit identification on the SS7 link to the receiving subscriber switching equipment.

BRIEF DESCRIPTION OF THE DRAWINGS

For a more complete understanding of the present invention and the advantages thereof, reference may be made to the following description taken in conjunction with the accompanying drawings in which.

DETAILED DESCRIPTION OF THE DRAWINGS

Class 5 central telephone offices such as the 1ESS and 1AESS switches do not generally possess Signaling System #7 protocol, or SS7, capability.

As described in U.S. Pat. No. 4,853,955, the SS7 protocol enables more rapid and efficient switching to occur by the use of a separate control circuit from the transmitting switching office to the receiving switching office. This control circuit is distinct from the information trunk circuit which carries the conversation information between the calling subscriber and the called subscriber. However, it is not economically feasible to replace the prior art switching equipment for newer equipment embodying the SS7 protocol. To upgrade the existing switching systems to accept the SS7 protocol requires not only that all of the requirements of the SS7 protocol be followed, but also that the existing switching circuit functions not be disturbed. They must be allowed to operate in their usual fashion when needed.

The SS7 protocol requires that a control circuit or SS7 link be established on which the calling station transmits the calling number, the called number, and the identification o the trunk circuit carrying the telephone message. This control circuit is separate from the trunk circuit which carries the subscriber message.

Figure 1:
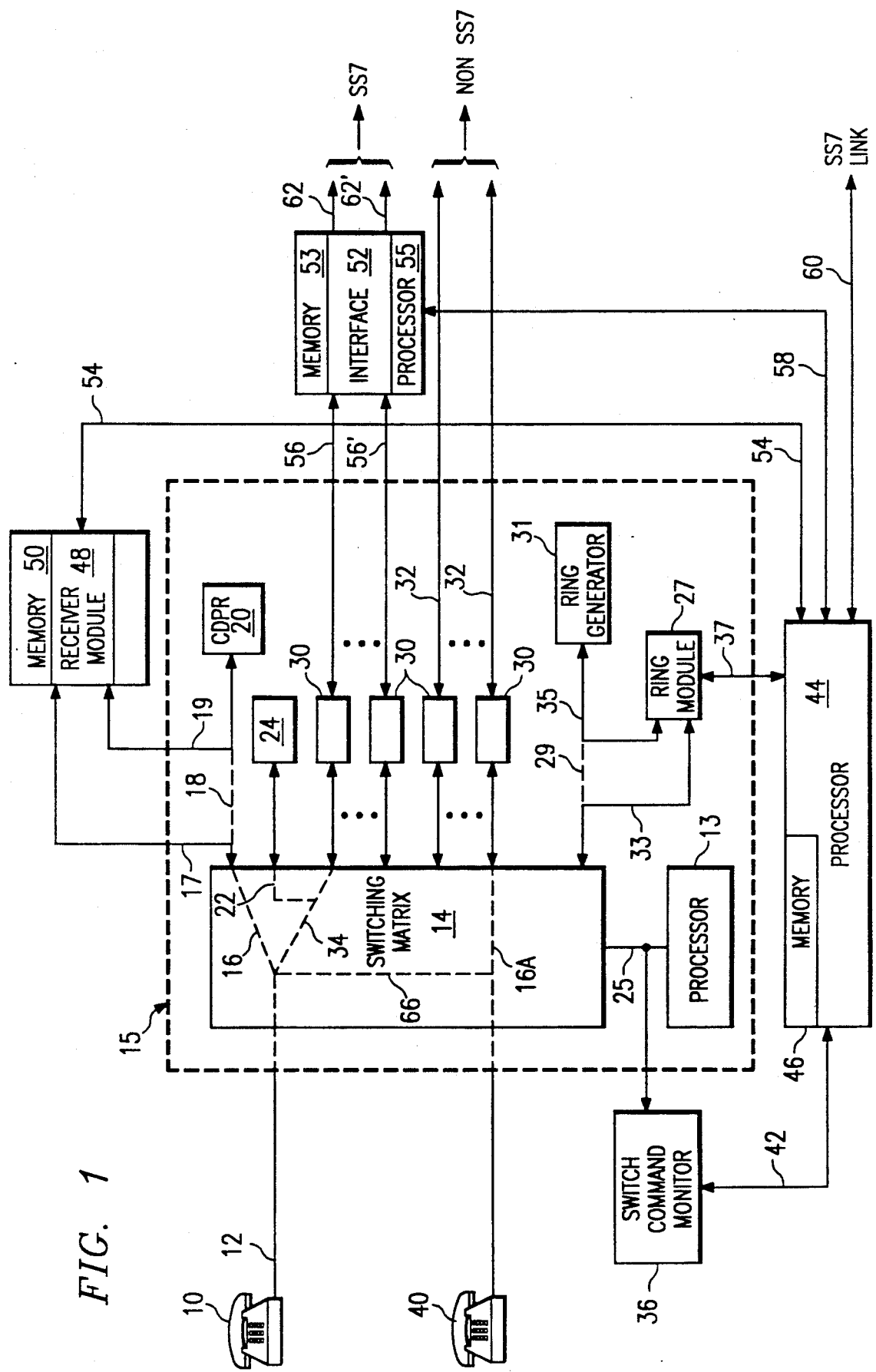
FIG. 1 is a diagrammatic representation of the apparatus of the present invention used in conjunction with existing 1ESS and 1AESS switching systems to upgrade these switches with the capability of controlling the connection, management and disconnection of incoming and outgoing telephone circuits using the SS7 protocol.

FIG. 1 illustrates the 1ESS and 1AESS switching system designated by the numeral 15 to which has been added equipment necessary to upgrade these systems to accommodate the SS7 protocol without disturbing the operation of the existing 1ESS or 1AESS system 15. It will be noted that the changes to the switching system 15 are that a switch command monitor 36 is connected to the processor bus 25 and the connection 18 between the switching matrix 14 and customer dial pulse receiver (CDPR) 20 is broken and a receiver module 48 is interposed between those two units using connections 17 and 19. In addition, the connection 29 between the switching matrix 14 and a ring generator 31 is broken and a ring module 27 is interposed between the two units using connections 33 and 35.

As illustrated in FIG. 1, an off-hook status occurs on line 12 as a result of the subscriber 10 going off-hook (or equivalent equipment action such as a PABX seizure). This off-hook status is identified in the switching system 15 by an interconnection to the switching matrix 14. It will be understood, of course, that a plurality of subscribers, as represented by additional telephone 40 may also be coupled to the switching matrix 14.

The switching system 15 performs its normal function of coupling the line 12 via matrix 14 using switching circuit 16 to the CDPR 20.

This functioning of the matrix 14 is controlled by a system processor 13 that operates in accordance with instructions of a stored program to control the action of the switching system 15. The system processor 13 collects inputs via scanners, analyzes this input information, and controls the switching operation by means of central pulse distributors and a peripheral address bus (PAB). The central bus pulse distributors (CPD) are conventional components of the 1ESS and 1AESS switches and control actions at various points (lines, trunks, service circuits, and the switching matrix 14) in response to the system processor 13. In accordance with conventional operation of the 1ESS and the 1AESS switch, a central pulse distributor enables switching circuits throughout the switching system 15. A central pulse distributor receives an enable address from the system processor 13 and decodes this address to generate enabling signals for the individual switches throughout the system 15. Conventionally, the central bus distributor also includes the peripheral address bus which functions to pass commands to individual switch controllers of the 1ESS and 1AESS switches.

The switch command monitor 36 interfaces to the peripheral address bus and the enable address bus to monitor the commands passed to the individual switch controllers of the 1ESS and 1AESS switches. Coupled to the switch command monitor 36 and receiving status information therefrom by means of a line 42 is an adjunct processor 44 having a memory 46 for storing the status signals from the switch command monitor for a specific call. A particular number is identified by the adjunct processor 44 as the calling number of subscriber 10 and is associated in its memory 46 with stored identifying data including line number and line status as described above.

A receiver module 48 is interposed between the matrix 14 and the CDPR 20 and provides appropriate status and signaling toward both the switching matrix 14 and the CDPR 20 so that the switching system 15 is not affected by the interposition of receiver module 48.

When the switching system 15 couples line 12 via the switching matrix 14 to the CDPR 20, in effect the line 12 is coupled to the receiver module 48.

The switch command monitor identifies the calling subscriber and receiver module interconnections and passes this information to the adjunct processor 44.

The calling subscriber identity and interconnection data is transmitted by the adjunct processor 44 to receiver module 48 through line 54. This information is stored in the receiver module memory 50. The receiver module 48 then returns a dial tone to the subscriber 10.

When the subscriber dials the called number digits, these digits are coupled to the receiver module 48. From these called number digits, the receiver module 48 searches its memory 50 to determine the call destination, such as an SS7 trunk or a non-SS7 trunk or an intra-office call circuit, and calling number information along with any additional information pertinent to the called number such as area code and the like.

If the receiver module 48 determines the call destination is to an SS7 trunk, the receiver module 48 repeats the called number digits into the CDPR 20. The digits when analyzed by the system processor 13, will cause a specific matrix switch 34 in switching matrix 14 to connect the calling subscriber to the trunk circuit 56 through trunk control circuit 30'.

The receiver module 48 generates a signal related to the specific call consisting of the called number. This signal is coupled to the adjunct processor 44 via line 54 and is stored in memory 46 associated with the specific call.

The switching system 15 using switching matrix 14, switch 22, transmitter 24 and trunk control circuit 30' will send the called number via a selected switching system trunk circuit 56 to trunk circuit interface 52 using the normal switching system process for a trunk call. Interface 52 also has a memory 53 for storing necessary information and a processor 55 for controlling information received and stored.

The trunk circuit interface 52 couples the selected switching system trunk circuit 5 to the SS7 network trunk circuit 62. The trunk circuit interface 52 then sends the called number received and the identification of the SS7 network trunk circuit 62 to the adjunct processor 44 via line 58.

The switching system 15 now connects line 12 to trunk circuit 56 via switching matrix 14, switch 34 and trunk control circuit 30'. The switch command monitor 36 sends the connection information to adjunct processor 44 via line 42.

The adjunct processor 44 now has the signals necessary for transmitting the SS7 protocol information on the separate SS7 link 60 to the call receiving switching office.

Thus, while the subscriber station 10 is now coupled through the switching matrix 14 via switch 34, appropriate switching system trunk circuit 56, trunk interface circuit 52 and through network trunk circuit 62 to the receiving switching office, the adjunct processor 44 is simultaneously transmitting the calling number, the called number, the trunk circuit identification and other appropriate information required for SS7 protocol on SS7 link 60 to the receiving switching office for connecting and managing the call when it is received at the receiving switching office.

Thus, it will be seen from FIG. 1, that the operation of the existing switching system is not affected by the connection of the equipment necessary to upgrade the switching system to accommodate the SS7 protocol.

If, when analyzing the subscriber dialed digits, the receiver module 48 determines that the call destination is a non-SS7 trunk group, it repeats the subscriber dialed digits to the CDPR 20. The switching system 15 processes the call as it would normally to a non-SS7 trunk circuit 32 through trunk control circuit 30.

If, when analyzing the subscriber dialed digits, the receiver module 48 determines that the call destination is an intra-office call and no special feature is required for the destination, the receiver module 48 repeats the subscriber dialed digits into the CDPR 20.

The digits when analyzed by the system processor 13 will cause a specific matrix switch 16A in switching matrix 14 to connect the called subscriber 40 via line 68 to the ring generator 31. The ring module 27 is interposed between the switching matrix 14 and the ring generator 31 in a manner so that the switching system 15 is not affected.

The switch command monitor 36 determines the called subscriber to ring module interconnection and passes the information to the adjunct processor 44. Processor 44, having determined that no special features are to be provided for the call, sends instructions to ring module 27 via line 37 to remain transparent. The system processor 13 causes the ring generator 31 to send a ringing signal to the called subscriber via ring module 27.

When the called subscriber 40 answers the call by going off-hook, the system processor 13 opens the called subscriber interconnection to the ring generator 31 and the ring module 27 via matrix switch 14 and connects the called subscriber 40 to the calling subscriber 10 via matrix switch 66 in switching matrix 14. The calling and called subscriber can now converse over the established voice path.

If, when analyzing the subscriber dialed digits, the receiver module 48 determines that the call destination is an intra-office call requiring special features such as selective call rejection for the destination based on the calling line information, the receiver module 48, from its data in memory 50 or via access to adjunct processor 44 memory information on line 54, can reject the call or forward the call to a different destination via appropriate digits sent to the CDPR 20.

At the receiving switching office, the same system shown in FIG. 1 works in reverse. Thus, adjunct processor 44 receives on SS7 link 60, network trunk circuit 62 identification, the calling number, the called number and other appropriate information per SS7 protocol from the originating switching office. If, when analyzing the called number, the adjunct processor 44 determines from its memory 46 that the called subscriber has gone off-hook, or is being provided a ringing signal by the switching system 15, then it can reject the call by normal SS7 protocol or forward the call using information from memory 46 to a different destination by modifying the called number appropriately.

If, when analyzing the called number, the adjunct processor 44 determines that the call destination is one requiring special features such as selective call rejection for the destination based on the calling line information, the processor 44, using information from memory 46, can reject the call or forward the call to a different destination by modifying the called number appropriately.

If the call has not been rejected, the called or the modified called number and trunk circuit identification received by adjunct processor 44 on SS7 link 60 are coupled on line 58 to the trunk circuit interface 52. The trunk circuit interface 52 sends the called number via existing trunk circuit protocol to the appropriate switching system trunk circuit 56. The trunk circuit interface 52 utilizes the trunk circuit identification to couple the SS7 network trunk circuit 62 to the appropriate switching system trunk circuit 56. The switching system 15 processes the call in the normal fashion, first ringing the called line and on answer coupling the switching system trunk circuit 56 to the called subscriber 10. Thus, the subscriber line 10 is now connected to the appropriate switch circuit 34 in switching matrix 14.

In addition, the adjunct processor 44 also has data stored in its memory 46 representing special features such as, for example only, distinctive ringing and calling line identification display. Terminals that have the ability to generate and accept such special feature information are identified as CLASS terminals. CLASS is a Service Mark of Bell Communications Research, Inc. In FIG. 1, subscriber telephone 40 may be considered such a terminal. Other terminals that are not capable of generating or receiving such special information are known as non-CLASS terminals. Terminal 10 in FIG. 1 may be considered such a terminal. Thus, if non-CLASS terminal 10 is to communicate with CLASS terminal 40, the adjunct processor 44, having received the identity and interconnection data related to calling terminal 10 and having received the called number from receiver module 48, identifies that terminal 40 is a CLASS terminal. It can, therefore, instruct the ring module 27 via line 37 to send the calling number of subscriber 10 to terminal 40 for display so that the receiving caller knows the number of the calling subscriber 10. In addition, if a specialized ringing tone is required, the processor 44 recognizes that fact and instructs the ring module 27 to generate the desired ringing tone and couple it to the called number subscriber 40. Other special features which the CLASS terminal 40 is capable of receiving may also be stored in memory 46 of the adjunct processor 44.

Similarly for an incoming SS7 call to a CLASS terminal 40, the processor 44 instructs the ring module 27 to send the calling number, received over the SS7 link, to the terminal 40 for display.

When the CLASS terminal 40 is communicating intra-office with a non-CLASS terminal 10, the processor 44 receives the called number from the receiver module 48 and in checking its memory bank 46, recognizes that terminal 10, the called number, is a non-CLASS terminal and thus, does not generate any special feature instructions on line 37. Thus, the present circuit allows communications intra-office from a CLASS terminal to a non-CLASS terminal or from a non-CLASS terminal to a CLASS terminal.

In addition, the upgraded circuit shown in FIG. 1 will allow the existing switching system to function as it normally functions with non-SS7 trunk lines, but will also allow the system to be operated using the SS7 system protocol as necessary. Thus, the underlying principles of the existing switching office are not affected. In addition, the SS7 capability is provided as disclosed herein in a cost effective manner and without adversely affecting the quality of service as perceived by the subscribers connected to the switching office.

Figure 2:
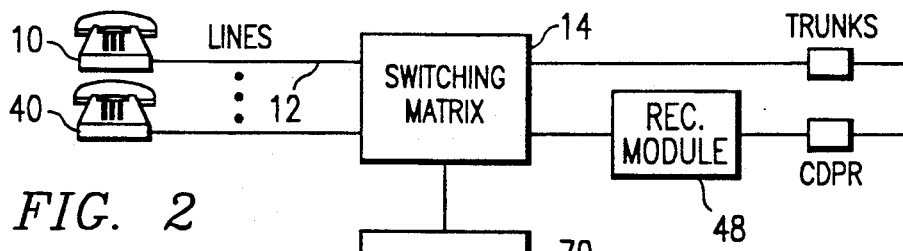
FIG. 2 is a block diagram of the switch command monitor including a central office bus interface and a bus monitor interface for monitoring the operation of the switching processor for completing interconnections through the switching matrix.

Referring to FIG. 2, there is shown in detail the interconnection of the switch command monitor 36 within the switching system 15. Like reference numbers are used for like parts in the various figures. As illustrated, the switching matrix 14 is connected to the subscribers 10 and 40 and to trunks and service circuits as previously described. Also illustrated in FIG. 2 is the switch controller 70 of the switching system 15 which is a conventional component of the 1ESS and the 1AESS switch. Connected to the switch controller 70 by means of a peripheral address bus (PAB) 72 is the system processor 13. Also connected to the switch controller 70 is a central pulse distributor (CPD) 74 by means of enable leads 76. Again, the CPD 74 is a conventional component of existing 1ESS and 1AESS switches. Also interconnected to the CPD 74 by means of an enable address bus 78 is the system processor 13. Execute leads 80 connect between the system processor 13 and the CPD 74.

Assembled into the CPD 74 is a central office bus (COB) interface 82 as part of the switch command monitor 36. As illustrated, the COB interface 82 connects to the peripheral address bus 72, the execute leads 80 and the enable address bus 78. Output terminals of the COB interface 82 are interconnected to a bus monitor interface (BMI) 84 as part of the switch command monitor 36. The BMI 84 is assembled into an available card slot of the adjunct processor 44 and receives data from the COB interface 82 for reformatting command data in appropriate formats for the adjunct processor 44.

In operation, the COB interface 82 senses the data and commands on the peripheral address bus 72, the enable address bus 78 and response to the execute signals on the leads 80 identifies the switching configuration of the switch matrix 14 as established by the system processor 13 as described. The COB interface 82 tests the validity of the data being monitored and encodes the data in binary form for transmission to the BMI 84. The BMI 84, after reformatting into appropriate formats, places the data from the COB interface 82 into a first-in, first-out buffer as part of the adjunct processor 44. The adjunct processor 44 processes the received data and responds thereto as described with reference to FIG. 1.

The adjunct processor 44 correlates all the commands to the switch controller 70 to trace the path from the subscriber line 12 to determine that the line is connected to a receiver module 48. The adjunct processor 44 sends the information to the receiver module 48 which utilizes the information as described previously. As the call progresses in the switching system 15, the subscriber line 12 will be connected to other service circuits such as a service circuit for providing audible ring back tones to the subscriber. The called line will be connected to a service circuit for providing ringing to the line. During the setting up of each connection, the system processor 13 will issue commands to control the various components of the switching system 15 and the adjunct processor 44 tracks these switch connections to maintain in memory each instance where a subscriber line is connected.

Figure 3:
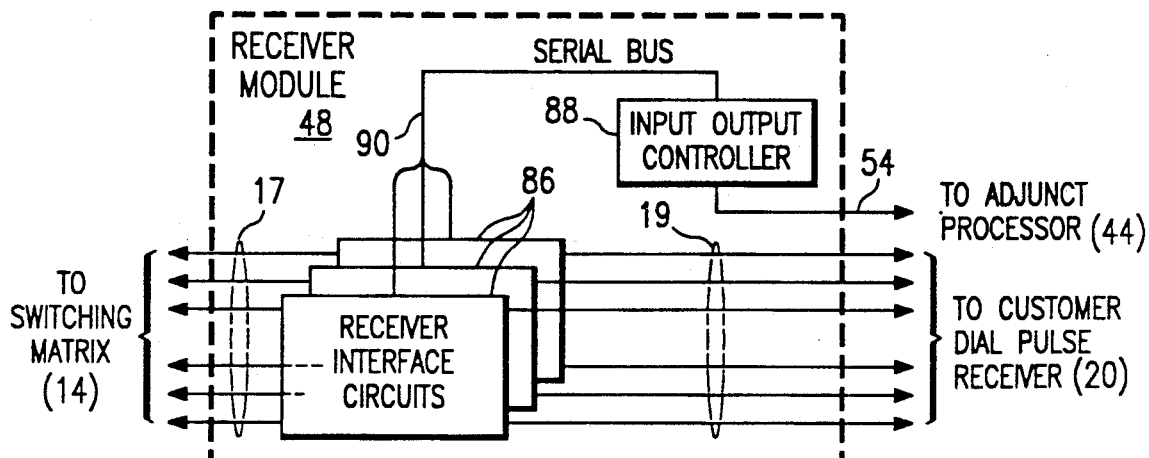
FIG. 3 is a block diagram of the receiver module for the apparatus represented in FIG. 1.

Referring to FIG. 3, there is shown a block diagram of the receiver module 48 that includes a plurality of receiver interface circuits 86 connected to an input/output controller 88 by means of a serial bus 90. During operation of the receiver module 48, the serial bus 90 transfers information and control messages between the receiver interface circuits 86 and the input/output controller 88. The protocol design for the serial bus 90 is based on a standard interface protocol as described in IEEE standard 802.3. Each of the receiver interface circuits 86 is provided with a plurality of interface lines 17 connected to the switching matrix 14 and a plurality of interface lines 19 connected to a plurality of Customer Dial Pulse Receivers (CDPR) 20.

In operation of the receiver interface circuits 86, the input/output controller 88 responds to information from the receiver interface circuits and provides function commands returned to the circuits. In addition, the input/output controller 88 includes processing software and memory storage to control information to the receiver interface circuits 86 and further is connected to the line 54 for transmitting information to the adjunct processor 44 and also receiving commands therefrom.

Figure 4:
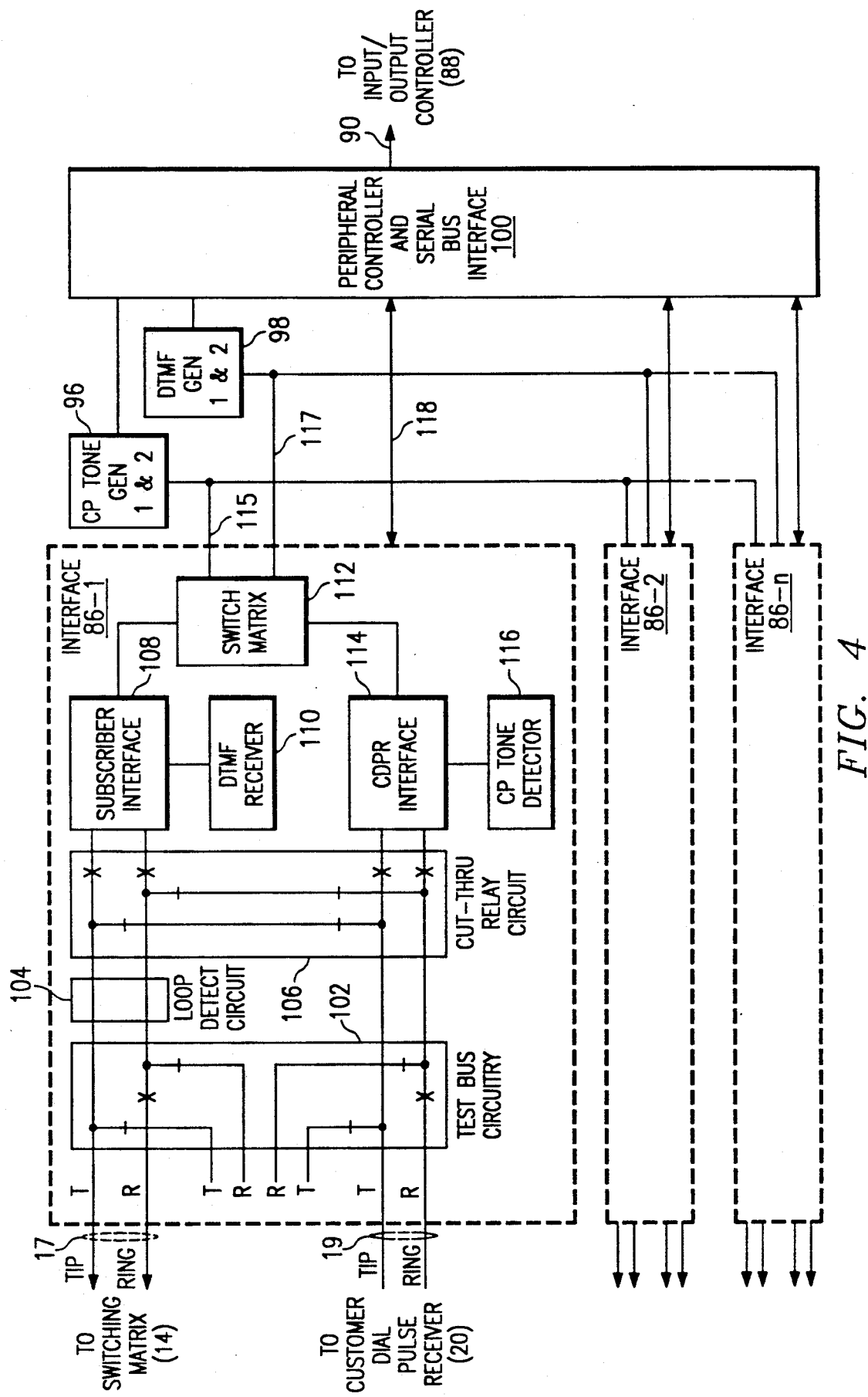
FIG. 4 is a block diagram of the receiver interface circuit for the receiver module of FIG. 3.

Referring to FIG. 4, there is shown a block diagram of the receiver interface circuits 86 including interface circuits 86-1 through 86-n. Connected to each of the interface circuits is call progress tone (CP TONE) generator 96 and a Dual Tone Multi Frequency (DTMF) generator 98. The call progress tone generator 96 and the DTMF generator 98 are interconnected to a peripheral controller and serial bus interface 100 that is also interconnected to each of the interface circuits 86-1 through 86-n.

Although only one of the interface circuits 86 is shown in detail, each interface circuit 86-1 through 86-n includes a test bus circuit 102 a loop detect circuit 104 and a cut through relay circuit 106. In addition, each of the interface circuits 86-1 through 86-n includes a subscriber interface 108 connected to a DTMF receiver 110 and also connected to a switch matrix 112. Connected to the switch matrix 112 is a CDPR interface 114 that has connected thereto a CP TONE detector 116.

With reference to the test bus circuit 102, this provides test access to both the switching matrix 14 and the CDPR 20 by means of "tip" and "ring" lines. In addition, the test bus circuit 102 provides self and loop tests between the switching matrix 14 and the CDPR 20.

Connected to the test bus circuit 102 is the loop detector circuit 104 that provides continuous monitoring of the on/off hook status of a connected line from a subscriber to a trunk whether the receiver interface circuit 86 is in either the so-called "cut through mode" or the "split mode".

With reference to the cut through relay circuit 106, it comprises an array of relays to provide the two mode capability for the interface circuit, that is, either a metallic cut through mode from the switching matrix 14 to the CDPR 20 (known as the "cut through" mode) or with the switching matrix 14 connected to the subscriber interface 108 and the CDPR 20 connected to the CDPR interface 114 (known as the "split" mode).

The subscriber interface 108 in a preferred embodiment provides an interface to the switching matrix 14 side of the receiver module 48. The subscriber interface 108 generates the battery feed to the subscribers telephone 10 through the switching matrix 14 and also provides other call completion functions such as loop detection, polarity reversal, party test, and dial pulse reception. Connected to the subscriber interface 108 is the DTMF receiver 110 that receives and responds to subscriber dialed DTMF digits.

As illustrated, the subscriber interface 108 connects to the switch matrix 112 to interconnect the subscriber interface to the call progress tone generator 96.

Next considering the CDPR interface 114, it enables and on/off switchable load to the CDPR 20 that appears to the CDPR as a subscriber telephone and associated interconnecting line and is connected to the switch matrix 112. In operation of the CDPR interface 114, it detects loop currents, polarity reversals generated by the CDPR 20 and provides application of first or second party (known as tip or ring party) indication to the CDPR 20.

To enable the receiver module 48 to detect the presence of a dial tone or any other call progress tone that may be generated by the CDPR 20 during the set up of a call, the call process tone detector 116 interconnects to the CDPR interface 114.

The CDPR interface 114 connects to the switch matrix 112 for access to the DTMF generator 98.

With reference to the call progress tone generator 96, in one embodiment it comprises two generators each designed to generate a dial tone, a busy tone or a special tone to the subscriber. The DTMF generator 98 generates DTMF signals to the CDPR 20 and like the call progress tone generator 96 is provided with redundancy including two DTMF generators.

In operation of the peripheral controller and serial bus interface 100, it functions to send commands and receive information to/from each of the receiver interface circuits 86-1 through 86-n by means of industry standard microprocessor parallel buses 118. The peripheral controller 100 continuously scans the receiver interface circuits 86-1 through 86-n to provide information to and receiver commands from the input/output controller 88. Upon receiving information from or detecting changes in any of the circuitry of a receiver interface circuit, the peripheral controller 100 initiates action back to the interface circuits or to the call progress tone generator 96 or the DTMF generator 98. The peripheral controller communicates with the input/output controller 88 by the serial bus 90 to obtain information or commands from the controller.

Figure 5:
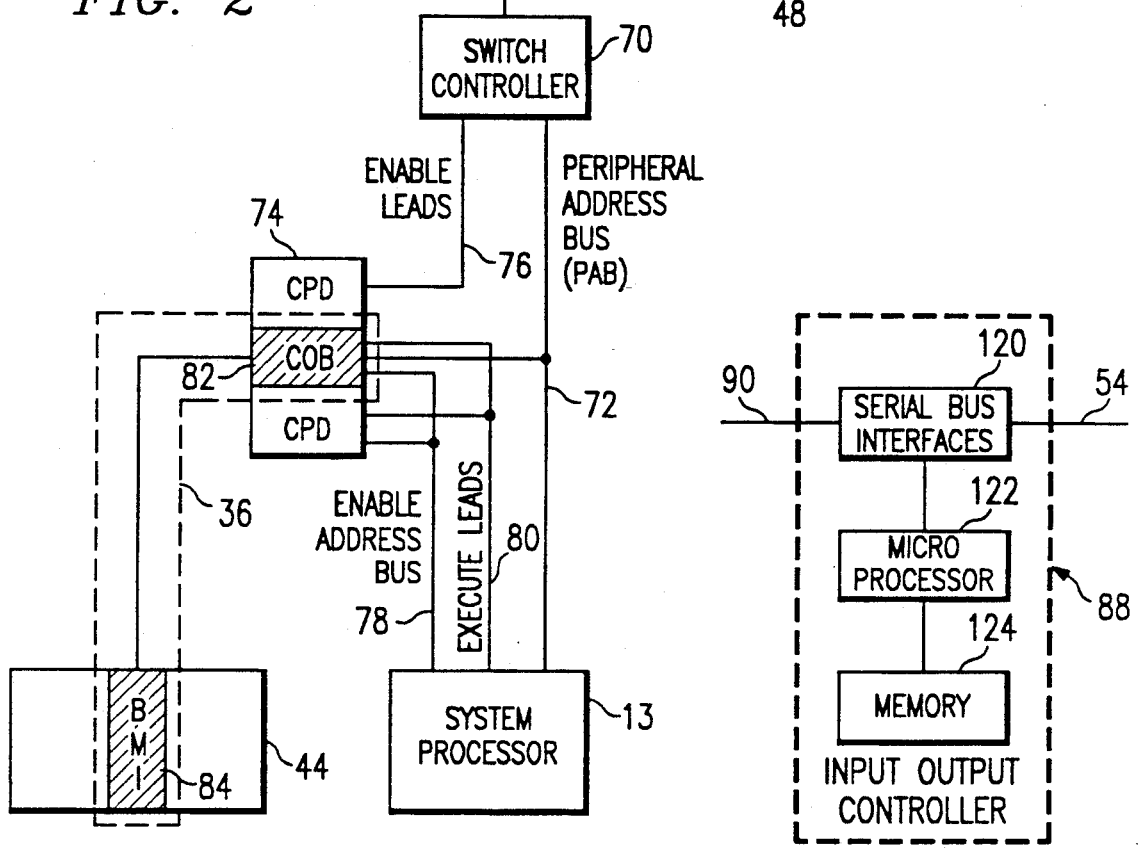
FIG. 5 is a block diagram of the input/output controller of the receiver module shown in FIG. 3.

Referring to FIG. 5, there is shown a block diagram of an embodiment of the input/output controller 88 including a serial bus interface 120 connected to the serial bus 90 and the line 54 to the adjunct processor 44. The serial bus interface 120 comprises a plurality of bus circuits for communicating with the receiver interface circuits 86 and the adjunct processor 44.

Connected to the serial bus interface 120 is a microprocessor 122 that receives status change and digit information via the serial bus interface from the receiver interface circuits 86. The microprocessor 122 processes the status changes and the digit information and based on a stored program in a memory 124, generates commands to the receiver interface circuits 86 or sends information to the adjunct processor 44. Similarly, the microprocessor 122 receives information from the adjunct processor 44 and based the stored program in memory 124 generates commands to the receiver interface circuits 86. With reference to the memory 124, it comprises conventional memory elements including read only memory and random access memory for storing the various programs and information received during operation o the microprocessor 122.

In operation of the receiver module 48, when a subscriber 10 goes off-hook the switching system 15 connects the subscriber through the switching matrix 14 to one of the receiver interface circuits 86. Initially, the receiver interface circuit 86 establishes a metallic connection between the switching matrix 14 directly to the customer dial pulse receiver 20. This enables the switching system 15 to conduct tests on the subscriber line 12 by means of the CDPR 20.

The input/output controller 88 receives information from the adjunct processor 44, identifying that subscriber line 12 is connected to one of the receiver interface circuits 86-1 through 86-n. After a predetermined interval of time, the input/output controller 88 sends a command to the receiver interface circuit 86 to disconnect the customer dial pulse receiver 20 from the switching matrix 14 thereby isolating the customer dial pulse receiver from the subscriber. In response to further commands from the input/output controller 88, the receiver interface circuit 86 provides battery voltage and a dial tone to the subscriber 10. Responding to the dial tone, the subscriber inputs the called number digits which are received by the receiver interface circuit 86 and transmitted to the input/output controller 88 via the serial bus 90. However, the subscriber may not dial the called number of digits or may not dial the digits in a prescribed time limit.

If the subscriber does not dial any digits (a permanent signal condition) within a predefined period of time, the input/output controller 88 sends a command to the receiver interface circuit 86 to outpulse predetermined digits into the associated customer dial pulse receiver 20 which results in the switching system 15 providing the subscriber 10 an announcement or a tone indicating the permanent signal condition. The time window for the permanent signal condition is programmable in the input/output controller 88 and is varied based on the traffic or usage of the receiver interface circuits.

Another condition which requires a predetermined response is when the subscriber takes longer than a predefined time between dialing the digits of the called number (partial dial condition). The input/output controller 88 then sends a command to the receiver interface circuit 8 to outpulse another set of predefined digits into the associated customer dial pulse receiver 20. This results in the switching system 15 providing the subscriber 10 a tone or announcement indicating this condition. Like the permanent signal condition, the partial dial condition is programmable and the input/output controller 88 will vary this time parameter based on the traffic or usage in time of the receiver interface circuits 86.

When the subscriber dials the called number digits within the predefined time limit, the input/output controller 88 analyzes the digits in context with the additional information stored in the memory 124 about the subscriber 10, that is to what features the subscriber is entitled to. If the dialed digits are acceptable as input, the controller 88 sends instruction to the receiver interface circuit 86 and DTMF generator 98 to outpulse the digits as received to the customer dial pulse receiver 20 and the switching system 15 processes the call in accordance with its normal routine. Under certain conditions, the input/output controller 88 will determine that the dialed called number digits do not require changing after only receiving a few of the digits. Under these conditions the controller 88 will send instructions to the receiver interface circuit 86 and DTMF generator 98 to outpulse the digits to the customer dial pulse receiver 20 as the digits are received from the subscriber 10, that is, overlap outpulsing the digits. Overlap outpulsing improves post dial delay over the delay resulting from the controller analyzing the complete set of called number digits.

If on analyzing the received digits, the input/output controller 88 determines that a special feature is to be provided, such as selective call rejection for the identified destination based on the calling number, then the input/output controller 88 receives such special information from either the memory 124 or over the line 54 from the adjunct processor 44. The controller 88 configures the number to be outpulsed to the switching system 15 and sends instructions to the receiver interface circuit 86 and DTMF generator for outpulsing the number to the customer dial pulse receiver 20. Any special feature identified with the calling subscriber or the called number will be processed in a similar manner.

In addition to the above functions, the input/output controller 88 also monitors the condition of the receiver interface circuits 86-1 through 86-n and reports any malfunctions by means of alarms as a part of the receiver module 48 and also transmits the malfunctioning condition information to the adjunct processor 44. The input/output controller 88 is programmed to respond to instructions from the adjunct processor 44 to periodically test the receiver interface circuits 86.

The invention has been described in connection with a preferred embodiment. This description is not intended to limit the scope of the invention to the particular form set forth, but, on the contrary, it is intended to cover such alternatives, modifications, and equivalents as may be included within the spirit and scope of the invention as defined in the appended claims.

I claim:

1. Apparatus for upgrading existing 1ESS and 1AESS switching equipment, that normally connects a calling subscriber to a called subscriber through a switching system having a switching matrix, a system processor, a customer dial pulse receiver, and at least one non-SS7 trunk circuit, with the capability of controlling the connection, management and disconnection of incoming and outgoing telephone circuits on SS7 trunk circuits using a SS7 link and the SS7 protocol comprising:

a switch command monitor coupled to the system processor for monitoring the status of a calling subscriber line and connection of the line through the switching matrix to the customer dial pulse receiver, a trunk circuit and other service circuits and formatting received information for processing in response to information relating thereto;

a receiver module coupled to the switching system for receiving called number digits, identifying a specific call and the trunk circuit as SS7 or non-SS7, and generating a called number signal representing the called number associated with the specific call, and repeating the called number digits into the customer dial pulse receiver of the switching system for coupling a calling subscriber line to the identified trunk circuit;

a trunk circuit interface coupled to predetermined ones of said SS7 trunk circuits and to said switching system for receiving the called number and generating a trunk circuit identification signal related to the specific call, said trunk circuit interface coupling the calling subscriber line to a selected SS7 trunk circuit to provide communication with a called subscriber; and processor means coupled to said switch command monitor for receiving information representing calling subscriber interconnections to said receiver module and to the trunk circuit for the specific call and generating the calling number for the specific call, said processor means also coupled to said receiver module for receiving a signal representing the called number associated with the specific call, and to said trunk circuit interface for receiving the trunk circuit identification signal for the specific call and transmitting the calling number, the called number, and the trunk circuit identification signal on the SS7 link to the switching equipment coupled to a called subscriber.

2. Apparatus as in claim 1 wherein:

said processor means further comprises means for receiving an incoming trunk circuit identification signal, and an incoming called number on the SS7 link from calling subscriber switching equipment;

means for coupling an incoming called number signal and the incoming trunk circuit identification signal from said processor means to said trunk circuit interface; and said trunk circuit interface further comprising means for utilizing the incoming trunk circuit identification signal to couple the incoming called number and a SS7 trunk circuit to the trunk circuit of the called subscriber switching equipment to establish a communication link with the called subscriber.

3. Apparatus as in claim 1 wherein the existing switching equipment further includes central pulse distributors and a switch controller and wherein said switch command monitor includes:

central office bus means coupled to the central pulse distributors, the switch controller and the system processor for monitoring commands and messages recognizing a subscriber off-hook condition and responding to the system processor establishing a connection between the subscriber through the switching matrix to the customer dial pulse receiver, the trunk circuit and other service circuits; and bus monitor interface means coupled to said processor means and to the central office bus means for formatting the commands and messages from said central office bus means to input to said processor means.

4. Apparatus as in claim 1 wherein said receiver module includes:

a memory for storing information relating the called number digits to an intra-office or trunk circuit destination; and translator means for comparing the called number digits with the stored information to identify the type of destination required by the called number digits.

5. Apparatus as in claim 1 further comprising:

said receiver module including means for identifying the called number digits as an intra-office call; and said processor means including means for storing special features information for each called number and calling number.

6. Apparatus as in claim 2 further comprising:

said processor means including means for storing special features information for each called number and calling number received on the SS7 link.

7. Apparatus as in claim 5 wherein the special features information includes data representing distinctive ringing and calling line identification display.

8. Apparatus as in claim 7 further including a ring generator and a ring module interposed between the switching matrix and the ring generator for delivering the special features information to the called subscriber.

9. Apparatus as in claim 6 wherein the special features information includes data representing distinctive ringing and calling line identification display.

10. Apparatus as in claim 8 wherein said ring module includes means for transferring the special features information to the called subscriber.

11. A method of providing existing 1ESS and 1AESS switching equipment, that normally connects a calling subscriber to a called subscriber through a switching system having a switching matrix, a system processor, a customer dial pulse receiver, other service circuits and at least one non-SS7 trunk circuit, with the capability of controlling the connection, management and disconnection of incoming and outgoing telephone calls on SS7 trunk circuits using an SS7 link and the SS7 protocol comprising the steps of:

monitoring by a switch command monitor coupled to the system processor the status of calling subscriber lines and connection of the lines through the switching matrix to the customer dial pulse receiver, a trunk circuit and other service circuits and formatting received information for processing in response to information relating thereto;

receiving in a receiver module coupled to the switching system a called number, identifying a specific call and the trunk circuit as SS7 or non-SS7 and generating a signal representing the called number for the specific call;

repeating the called number to the customer dial pulse receiver for coupling a calling subscriber line to the identified trunk circuit;

receiving in a trunk circuit interface coupled to predetermined ones of the SS7 trunk circuits and to the switching system the called number and generating a trunk circuit identification signal related to the specific call and coupling the calling subscriber line to a SS7 trunk circuit to provide communication with the called subscriber; and receiving in processor means coupled to the switch command monitor information representing calling subscriber interconnections to the receiver module and to the trunk circuit for the specific call and generating the calling number for the specific call, and receiving from the receiver module also coupled to the processor means the signal representing the called number for the specific call, and receiving from the trunk circuit interface the trunk circuit identification signal for the specific call and transmitting the calling number, the called number and the trunk circuit identification signal on the SS7 link to switching equipment coupled to the called subscriber.

12. A method as in claim 11 further comprising the steps of:

receiving in the processor means an incoming trunk circuit identification signal, an incoming called number signal from an SS7 link from switching equipment coupled to an incoming calling subscriber;

coupling the incoming called number and the incoming trunk circuit identification signal from the processor means to the trunk circuit interface; and in response to the incoming called number and the incoming trunk circuit identification signal, sending by means of the trunk circuit interface the incoming called number for an identified switching system trunk circuit and coupling an identified SS7 trunk circuit to the switching system trunk circuit to provide communication between an incoming calling subscriber and the called subscriber.

13. A method as in claim 11 further including the steps of:

identifying the called number as an intra-office call;

storing special features information in a memory of the processor means for each called number and calling number;

receiving at the switch command module from said processor means a signal representing a called party interconnection to a ring module; and transferring the special features information related to the called number to the ring module for subsequent transfer to the called number subscriber.

14. A method as in claim 12 further including the steps of:

storing special features information in a memory of the processor means for each called number and calling number received on the SS7 link;

coupling the processor means to the switch command monitor for receiving the signal representing the called party interconnection to a ring module; and transferring the special features information related to the called number to the ring module for subsequent transfer to the called number subscriber.

15. A method as in claim 13 wherein the step of identifying the called number as an intra-office call further comprises the steps of:

storing information in a memory in the receiver module relating the called number to an intra-office destination.

16. A method as in claim 13 wherein the special features information includes data representing distinctive ringing and calling line identification display.

17. A method as in claim 16 further including the step of transferring the special features information to the called subscriber.

18. A method as in claim 12 wherein the special features information includes data representing distinctive ringing and calling line identification display.

19. A method as in claim 18 further including the step of transferring the special features information to the called subscriber.

20. A receiver module for use in upgrading existing telephone switching equipment, the receiver module collecting called number digits and analyzing such called number digits for enhanced subscriber services, comprising:

receiver interface means for providing either a connection of a subscriber via a switching matrix to a customer dial pulse receiver or splitting a connection between the switching matrix and the dial pulse receiver;

for the split connection, the receiver interface means further providing a dial tone to the subscriber and collecting digits from the subscriber; the receiver interface means also receiving dial tones from the customer dial pulse receiver and sending the called number digits to the customer dial pulse receiver; and an input/output controller responding to subscriber identifying information from a processor as a part of the switching equipment to generate commands to said receiver interface means to provide the dial tone to a subscriber, to receive and analyze the called number digits and generate a command to out pulse the received called number digits or modified called number digits to the customer dial pulse receiver.

21. A receiver module as set forth in claim 20 wherein said input/output controller includes:

a memory for storing the subscriber identifying information and command instructions; and a microprocessor receiving status change and digit information from said memory, and in response to instructions, assembling commands for said receiver interface means.

22. A receiver module as set forth in claim 21 wherein said memory stores special feature data for subscribers and said microprocessor responds to the special feature data to assemble commands to said receiver interface means.

23. A receiver module as set forth in claim 20 wherein said input/output controller responds to a partial dial condition from the subscriber to generate a command to said receiver interface means to outpulse predetermined digits to the customer dial pulse receiver to enable the telephone switching equipment to provide announcements to the subscriber.

24. A receiver module as set forth in claim 20 wherein said input/output controller responds to a permanent signal condition to generate a command to said receiver interface means to outpulse predetermined digits to the customer dial pulse receiver to enable the telephone switching equipment to provide announcements to the subscriber.

* * * * *